United States Patent [19]

Rudell et al.

[11] Patent Number: 4,949,489
[45] Date of Patent: Aug. 21, 1990

[54] EDGE-LIT MULTIPLE IMAGE DISPLAY DEVICE

[76] Inventors: Elliot A. Rudell, 6556 Sattes Dr., Rancho Palos Verdes, Calif. 90274; Roger J. Gardner, 29641 S. Western Ave., Rancho Palos Verdes, Calif. 90732

[21] Appl. No.: 378,087

[22] Filed: Jul. 11, 1989

Related U.S. Application Data

[63] Continuation of Ser. No. 138,669, Dec. 28, 1987, abandoned.

[51] Int. Cl.⁵ .............................................. G09F 13/18
[52] U.S. Cl. ..................................................... 40/546
[58] Field of Search ............. 40/546, 547, 152, 152.1, 40/152.2

[56] References Cited

U.S. PATENT DOCUMENTS

| | | | |
|---|---|---|---|
| 2,347,665 | 5/1944 | Christensen et al. | 40/546 |
| 2,531,937 | 11/1950 | Gratiot | 40/546 |
| 3,399,476 | 9/1968 | Davis | 40/546 |
| 4,386,476 | 6/1983 | Schulman | 40/546 |
| 4,697,365 | 10/1987 | Moosbrugger et al. | 40/546 |

Primary Examiner—Gene Mancene
Assistant Examiner—Michael Lynch
Attorney, Agent, or Firm—Plante, Strauss, Vanderburgh & Connors

[57] ABSTRACT

There is disclosed an edge-lit multiple image display device. The device utilizes a plurality of internal-reflecting-light sheets which are provided in a stacked array. Images are formed on the surfaces of the sheets with a coating of a material that changes the density on the internally reflecting surface of its respective sheet. A light source is provided to illuminate the edges of the stacked array of sheets, with a light shield that can be moved to selectively direct the light to one edge at a time of the edges of the sheets in the stack. As the light shield is moved to selectively and alternatingly illuminate the edges of selected sheets in the stacked array, the images displayed on each of the edge-lit plates becomes illuminated, appearing and then disappearing as the light source is applied and then removed from the edge of its respective plate. This can be used to provide an animated display.

20 Claims, 8 Drawing Sheets

EDGE-LIT MULTIPLE IMAGE DISPLAY DEVICE

This is a continuation, of application Ser. No. 07/138,669 filed Dec. 28, 1987, now abandoned.

BACKGROUND OF THE INVENTION

1. Field of the Invention

This invention relates to multiple image display device and, in particular, to an edge-lit, multiple display device useful as an animated toy.

2. Description of the Prior Art

Numerous children's activity drawing toys are currently on the market. The notable products which are manufactured and offered for sale by The Ohio Art Company are: ETCH A SKETCH and the ANIMATOR. The ETCH A SKETCH product requires the child to rotate two knobs to control an XY-plotter underneath an enclosed sandwich of graphite powder. Moving the plotter point scratches out a line in the dark powder. The ANIMATOR product has a liquid crystal digitized display window that is controlled by the child to create, store and playback, in animation fashion, a series of monochromatic images consisting of liquid crystal sectors which are alternately displayed and cleared.

Edge lighting display of menu sign boards has become popular over the last several years. These sign boards typically comprise a glass or acrylic panel that is in contact with a light source, such as a fluorescent bulb. The bulb is positioned along an edge of the panel and the light is internally reflected within the panel, as the angles of incidence of the reflected light beams striking the internal top and bottom surfaces of the plate are insufficient to permit transmission of the light through those surfaces. Light therefore travels through the plate, but only shines through the edges because of total internal reflection. However, drawing on the top surface of the plate with a water base wax crayon provides a medium density change that allows for light beams to travel through the coating deposited by the crayon; thereby illuminating the line or drawing and causing it to appear to an observer that the images drawn on the surface are actually being lighted, similar to a neon light effect.

To our knowledge, it has never been known to utilize edge lighting in a manner to create animation, in which multiple surfaces are individually drawn on and then selectively illuminated in a sequential fashion so as to provide an observer or observers with multiple illuminated images alternately appearing and disappearing in the same apparent position, simulating full color animation and also providing an active device for commercial signs that could be quickly and easily changed or modified by the user.

BRIEF DESCRIPTION OF THE INVENTION

This invention comprises an edge-lit multiple image display device. The display device utilizes a plurality of internal-reflecting-light sheets which are provided in a stacked array, each of which is adapted to display an image. A light source is provided to illuminate the edges of the stacked array of sheets, with a light shield that can be moved to selectively direct the light to one edge at a time of the edges of the sheets in the stack. Images are formed on the surfaces of the sheets with a coating of a material that changes the density at the internally reflecting surface of its respective sheet, whereby the image formed by the coating is illuminated. As the light shield is moved to selectively and alternatingly illuminate the edges of selected sheets in the stacked array, the images displayed on each of the edge-lit plates becomes illuminated, appearing and then disappearing as the light source is applied and then removed from the edge of its respective plate.

Closely related images can be employed on successive sheets of the stacked array and, as the light source is moved in succession between the edges of the plates in the stack, the image will appear to be animated. The light or shutter mechanism can be manually or power driven and, optionally, a multiple colored filter can be used to vary the color of the edge illumination.

BRIEF DESCRIPTION OF THE DRAWINGS

The invention will be described with reference to the FIGURES of which.

DESCRIPTION OF PREFERRED EMBODIMENT

Figure 1:
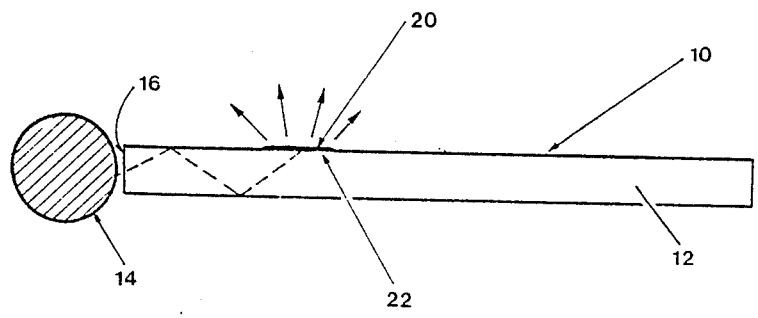
FIG. 1 is a sectional view of a prior art sign utilizing edge illumination.
Figure 2:
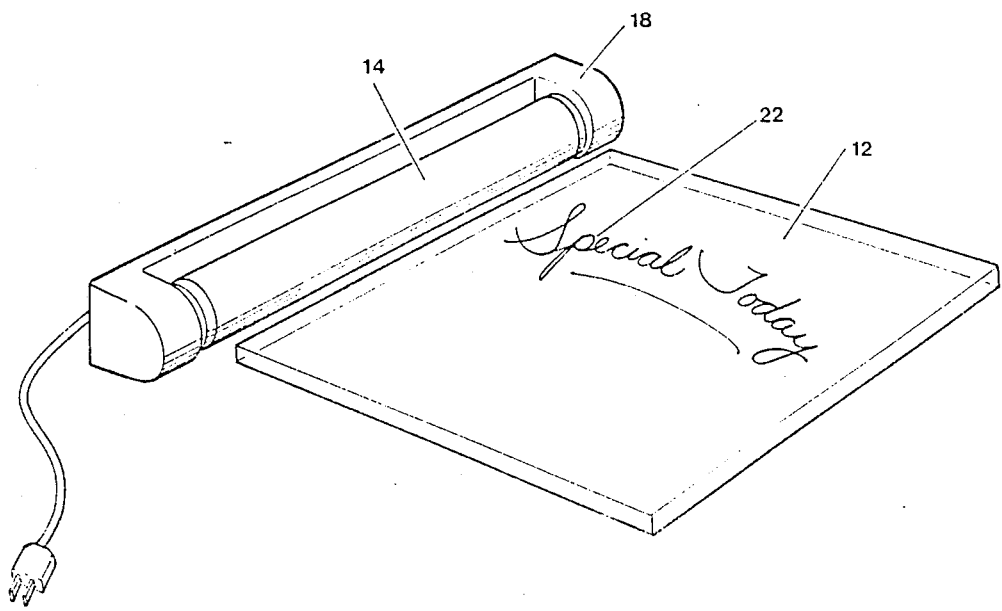
FIG. 2 is a perspective view of the edge illuminated sign of FIG. 1.

Referring now to FIGS. 1 and 2, there is illustrated an edge illuminated menu sign 10 similar to signs used in restaurants. As there illustrated, the sign has a plate 12 which is formed of a transparent and totally internally reflecting material, e.g., polycarbonate, glass, polymethylmethacrylate, etc. Typically, this plate has a substantial thickness, e.g., about ¼-⅜ inch. A light source 14 is positioned adjacent edge 16 of the plate 12 to direct illumination into the edge 16 of the plate where the light is internally reflected as shown by the phantom lines of FIG. 1. The light source is illustrated in greater detail in FIG. 2 is typically a fluorescent lighting fixture 18, although incandescent light can also be substituted.

The device is used in restaurants as an illuminated sign board for a menu or of the daily specials. For this purpose, printing or writing is applied to the surface of the plate using a water base wax crayon that leaves a deposit 20 on the surface of the plate. As the deposit formed on the plate has a density closer to the density of the material of the plate than air, the internal light refraction property of the plate is lost at its interface 22 with the wax deposit 20, resulting in illumination of the wax deposit and creating the optical impression of an iridescent coating or writing on the surface of the plate.

Figure 3:
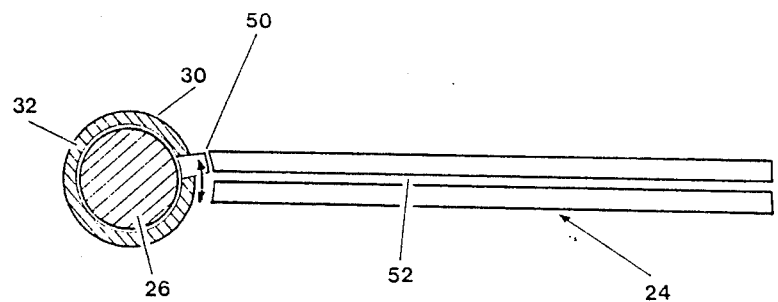
FIG. 3 illustrates a simple two-image display device in accordance with this invention.
Figure 4:
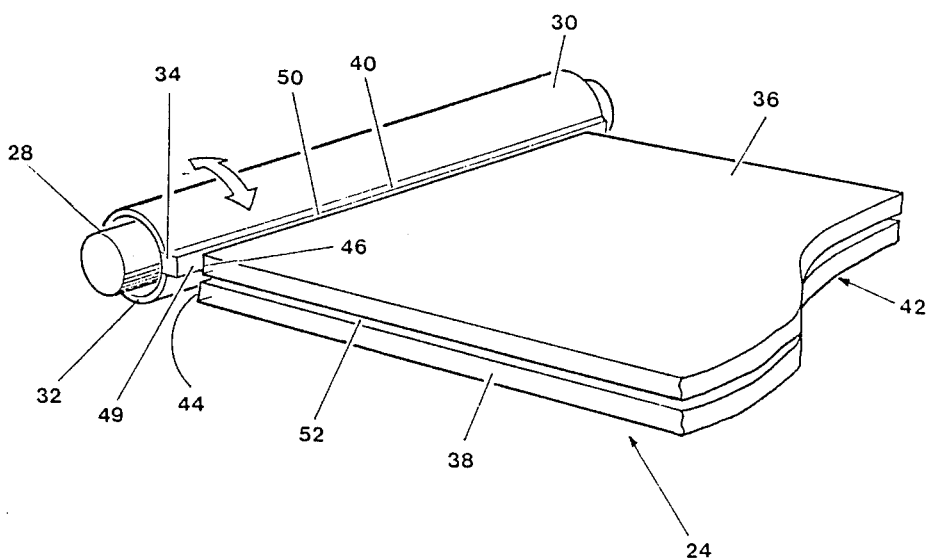
FIG. 4 is a perspective view of the invention of FIG. 3.

Referring now to FIGS. 3 and 4, there is illustrated a simple, two-image display device 24 of the invention. As there illustrated, a light source 26 is provided as a generally elongated tube 28 which can be a fluorescent tube or can be a glass cylinder containing an incandescent bulb or several bulbs. The light source is conventional and not illustrated in detail. It can be a fixture such as shown in FIG. 2 with a household electrical cord, or can be a low voltage light with a power transformer and/or a battery pack. The tube 28 provides illumination and is surrounded by a shield 30 formed with a concentric cylinder 32 of an opaque, preferably light-absorbing material. Its light absorbency can be enhanced by painting or coloring the shield black. A narrow slit 34 is formed along the shield 30 coextensive its length. This slit 34 provides the desirable edge illumination for the plurality of stacked plates 36 and 38. In the preferred embodiment, the light shield supports an optical window element 40 which can be a rod having a square or rectangular cross section which is seated within the slit 34.

As previously mentioned, a plurality of display plates 36 and 38 are provided. In the embodiment of FIGS. 3 and 4, the stack 42 includes an upper plate 36 and a lower plate 38, each formed of a transparent and totally internally reflecting medium such as glass, or plastics such as polycarbonate, polymethylmethacrylate, etc. The edges 44 and 46 of the plates which are adjacent the light source are preferable arcuate with a radius about the center line of the light source and, preferably, the opposite edge 49 of the light window element 40 has a mating contour, thereby providing a minimum gap 50 between these edges. Preferably, the upper and lower plates are stacked together with a small separation gap 52 which is from 0.05 to about 0.1 inch. This insures that any wax coating which is deposited on the top surface of the lower plate 38 does not transfer to the undersurface of the upper plate.

The device is used by applying an image to each of the upper and lower plates. This image can be applied using various means, preferably by drawing the image on each plate using wax crayons. For ease of cleaning the plates, it is preferred to use water base wax crayons. When the images on the upper and lower plate differ from each other, the device will create the illusion of animation as the light shield 30 is oscillated in the motion indicated by the solid double arrowhead line of FIG. 4. The oscillation of the light shield 30 selectively and alternately illuminates one of the upper and lower plates in oscillating fashion to create the illusion of animation.

Figure 5:
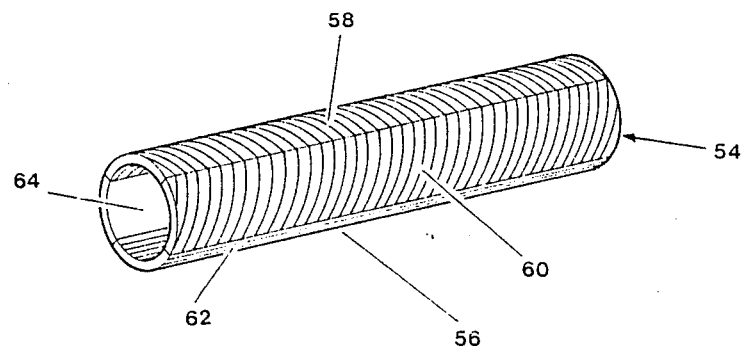
FIG. 5 is a perspective view of a tubular colored filter useful in the invention.

The images will appear to be iridescent images corresponding to the color of the wax crayon used for coating of the plates. If desired, additional capability for colored images can be imparted by use of colored filters which are positioned between the light source and the edges of the plates 36 and 38. A suitable color filter 54 is shown in FIG. 5 as comprising a tubular sleeve 56 that is formed of four sections, with section 58 providing red, section 60 providing blue, and section 62 providing yellow illumination. Section 64 is clear to provide white light.

Figure 6:
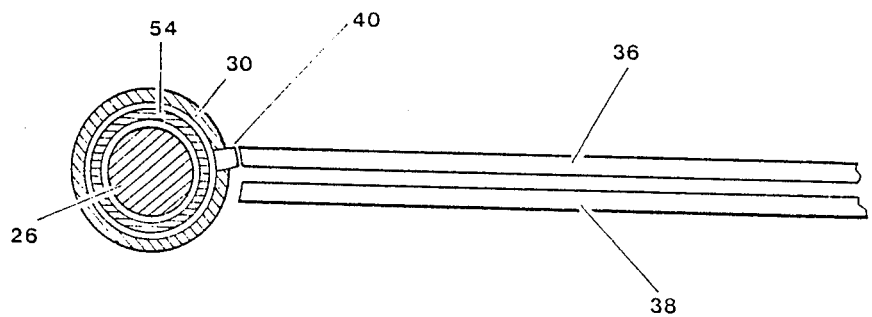
FIG. 6 is an elevational sectional view of the filter of FIG. 5 with a light source useful in the invention.
Figure 7:
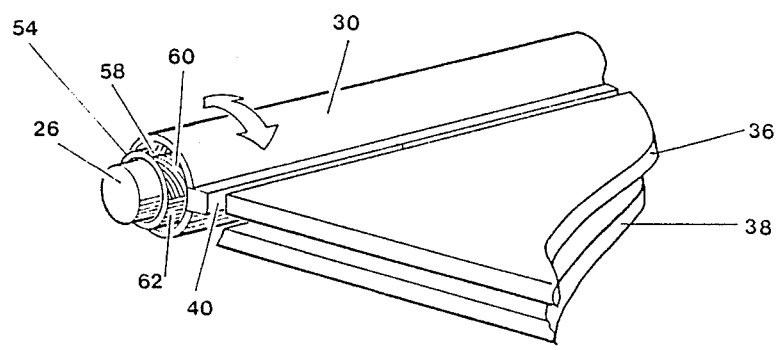
FIG. 7 is a perspective view of the device of FIG. 6.

FIG. 6 is an elevational view of the light source 26 described in FIGS. 3 and 4 as modified to include the filter 54 of FIG. 5. As there illustrated, the tubular filter 54 is placed concentrically between the light source 26 and the light shield 30. The position of the color filter is also shown in the perspective view of the assembly which appears as FIG. 7. In this position, the rotation of the filter 54 will selectively move one of its colored sector bands 58, 60 and 62 opposite the slit 34 and light window 40, thereby providing monochromatic illumination through the light window 40 into one of the edges 44 and 46 of the stacked plates.

Figure 8:
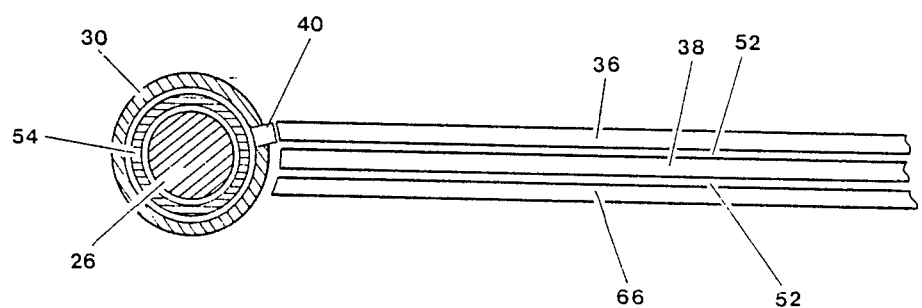
FIG. 8 is a sectional view of a three-image display device according to the invention.

As previously mentioned, a plurality of stacked plates can be employed and FIG. 8 illustrates a stacked array of three plates 36, 38 and 66 which are all mounted in a superimposed array and separated from each other by very thin air gaps 52.

Figure 9:
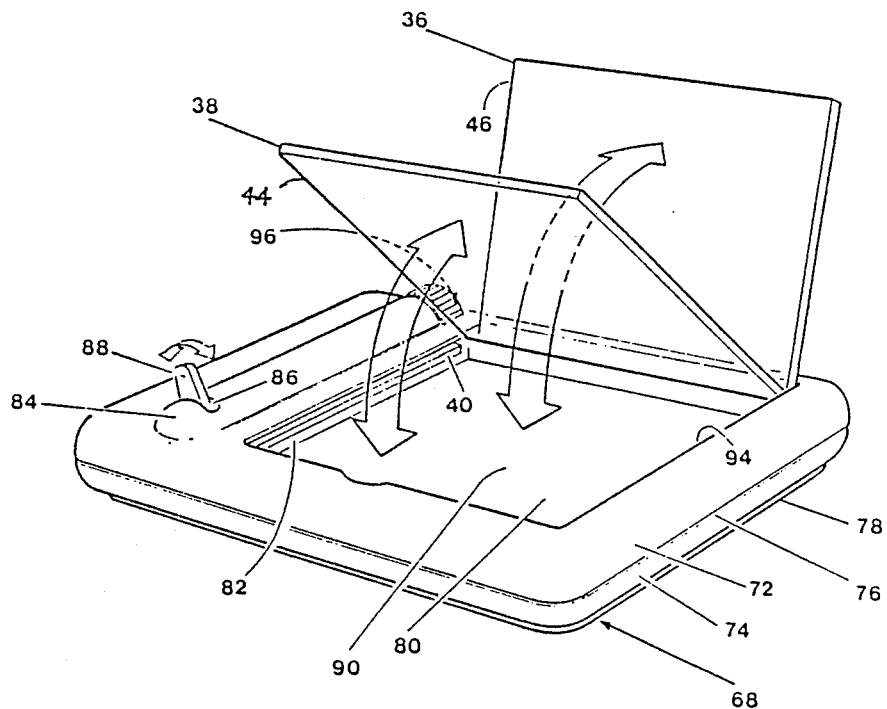
FIG. 9 is a perspective view of a toy for animated sketching incorporating the invention.

Referring now to FIG. 9, the invention is illustrated as embodied in a toy 68. As there illustrated, the toy 68 has an external housing formed of an upper housing member 72 and lower housing member 74 joined along the midline 76 of the toy 68. The lower housing member 74 has a base 78 coextensive with most of its undersurface and the upper housing member 72 has a central opening 80 forming a recess 90 in the toy 68, in which are pivotally supported a plurality of plates 36 and 38. Recess 90 can be a dark color to provide a strong visual distinction between the recess 90 and the artwork to be drawn on plates 36 and 38. Along one side of the upper housing member 72, coextensive with one edge 82 of the opening 80, there is a longitudinal bulge 84 which surrounds the light source previously described. The bulge 84 for the light source has a transverse slot 86 through which extends a handle 88 that is secured to the light screen, previously described. This light screen has a light transmitting window element 40 that extends into an abutting relationship with the edges 46 and 48 of the plates 36 and 38. The plates are preferably pivotally supported in the central recess 90 of the housing which is formed by the central opening 80 of the upper housing member 72 by hinge pins (not shown) which are pivotally received in bores along the each of the opposite sides 82 and 94 of the sidewalls of recess 90.

The light source also includes a color change selector which is the cylindrical knob 96 at the rear of the bulge 84 which forms the housing for the light source. This knob 96 is an integral extension of the cylindrical color filter 54 shown in FIG. 5 and rotation of the knob 96 thus rotates one of the several colors of the color filter 54, thereby providing selection of the color of illumination from the light source.

Figure 10:
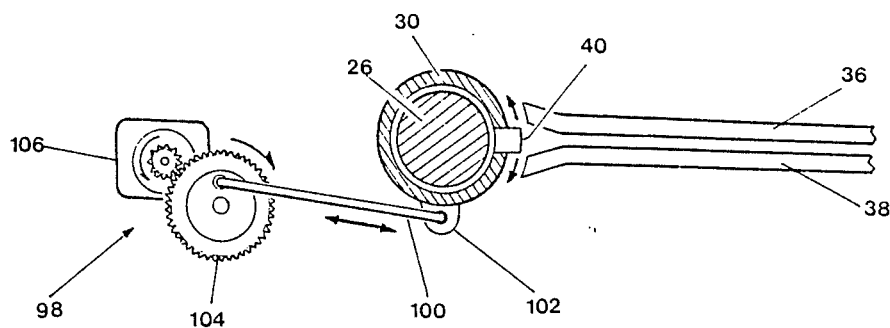
FIG. 10 is a view of a suitable mechanical drive linkage for oscillating the light shield used in the invention.

Referring now to FIG. 10, the invention is shown as incorporating a power driven mechanism 98 for oscillating of the light screen. As there illustrated, the upper and lower plates 36 and 38 are in a stacked array for light receiving relationship to the window 40 of the light shield 30. The light shield 30 is mounted for rotary movement about the axis of the light source 26, all as previously described. The mechanism for oscillating the light shield 30 and thereby moving the light window 40 between the upper and lower plates comprises a crank arm 100 which is pivotally received in the lug 102 of the light shield 30 and which has its opposite end received in an eccentric position on gear 104. This gear 104 is driven by a suitable motor 106, which can be a low voltage, direct current motor. The mechanism is thus operative to translate the rotary motion of the motor to an oscillating movement of the shield 30 and light window 40.

Figure 11:
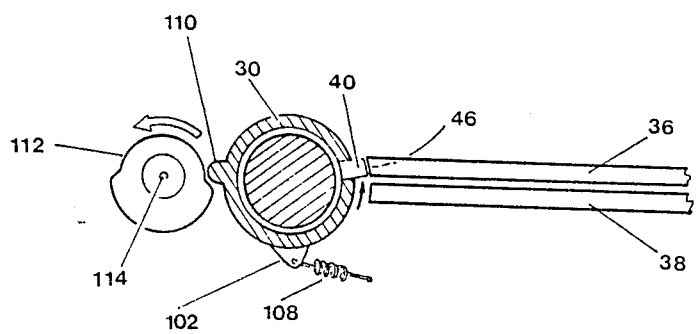
FIGS. 11 and 12 illustrate a cam driven oscillating mechanism to operate the light shield used in the invention.
Figure 12:
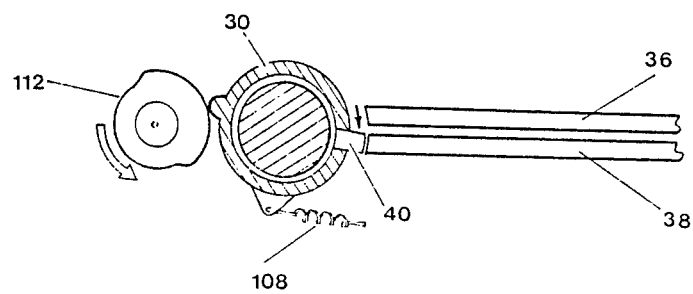

Referring now to FIGS. 11 and 12, there is illustrated a suitable motor driven cam mechanism for oscillating the shield and light window. In this construction, the light shield 30 has a lug 102 having an aperture to receive one end of a tension spring 108, thereby resiliently biasing the window 40 into one of its two positions, e.g., into the upper position shown in FIG. 11. In the upper position, the window 40 transmits light from the source 26 to the opposed edge 46 of the upper plate 36 for internal reflection therein. The shield 30 also has a cam follower 110 which is mounted opposite the cam 112 which is secured to a motor driven shaft 114. The motor (not shown) is effective in rotating this shaft, preferably through a gear reduction mechanism, and rotating the cam 112 against the cam follower 110, whereby the screen 30 is oscillated between the positions shown in FIGS. 11 and 12. This is effective in selectively and repeatedly illuminating one of the two plates.

Figure 13:
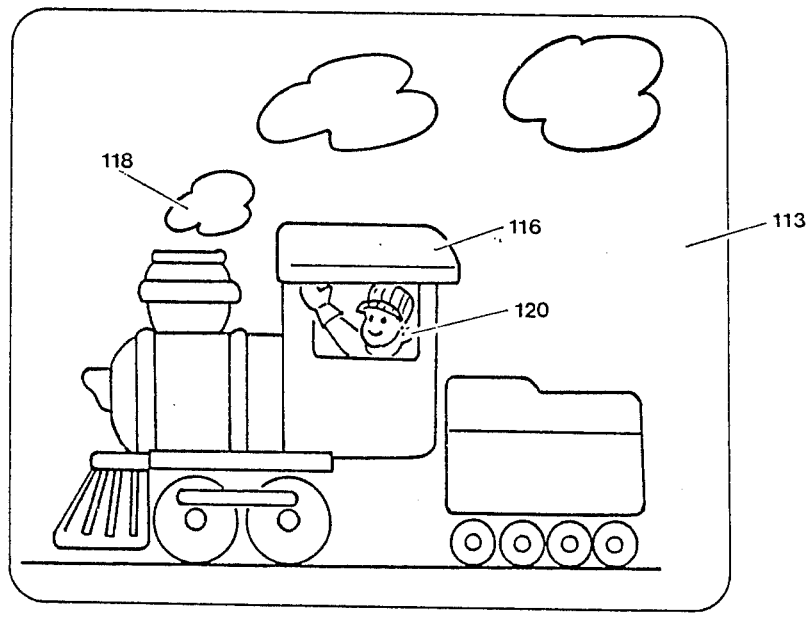
FIGS. 13 and 14 illustrate useful animated views for the invention.
Figure 14:
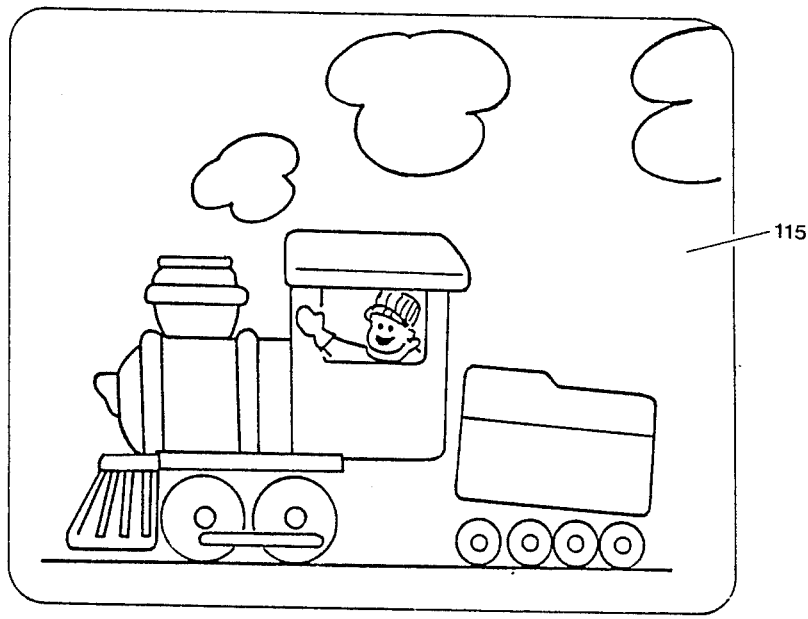
Figure 15:
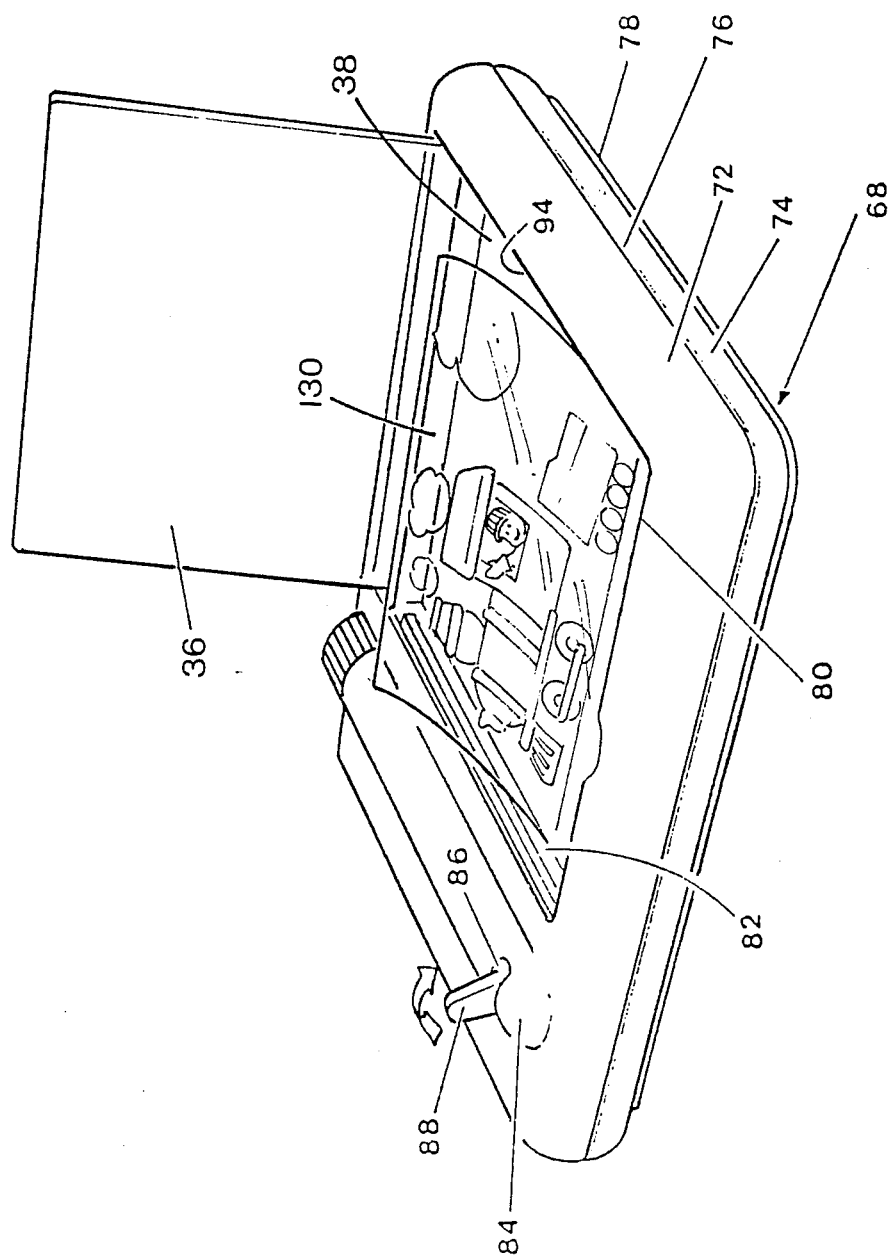
FIG. 15 shows a wax image transfer being applied to a plate.

Referring now to FIGS. 13 and 14, there are illustrated suitable illustrations for animation. Patterns 113 and 115 are provided depicting a train 116 as if moving from right to left with smoke 118 being discharged from the train and with an engineer 120 waving. These images can be drawn, freehand, onto the top surfaces of the plates 36 and 38 using a wax crayon, preferably a water base wax crayon. The crayon can be colored and various parts of the illustration can be drawn with different colors. Alternatively, the images shown in FIGS. 13 and 14 can be patterns which are traced onto the plates 36 and 38. In another embodiment, shown in FIG. 15, the images can be wax transfers 130, in which the images are printed on a suitable plastic or waxed transfer paper, and then transferred to the plates 36 and 38 by applying the transfer papers with the waxed images against the plates and rubbing across the top, exposed surface of the transfer paper to transfer the images onto the plates.

Although the invention has been described with illustration of the preferred embodiment of a child's drawing device for the creation of animation, it could also be used for display of advertising messages, or for commercial art of various applications.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. A children's and drawing toy for the sequential display of two or more temporary and removable images which comprises:
    a. a light source;
    b. at least two thin plates having opposite planar surfaces of an internally light-reflecting material secured together by attachment means, said plates being positioned in a superimposed, stacked array with at least one edge of each juxtapositioned to a respective edge of the other and adjacent to and coextensive with said light source, said attachment means permitting said plates to be moved out of said stacked array, exposing and providing access to the planar surface of each plate whereby images of light transmitting coatings may be applied and removed therefrom;
    c. at least two images, each formed as a removable light transmitting coating having a sufficient density to cause the loss of the internal light refraction of said plate and temporarily adhered onto one of the planar surfaces of a respective one of said plates; and
    d. means to selectively and sequentially illuminate each of said juxtapositioned edges of said plates to thereby illuminate and selectively display said images sequentially, thereby providing a children's drawing toy for the creation and display of animated images.

2. The children's drawing toy of claim 1 wherein said means to selectively illuminate comprises:
    a. a light shield surrounding said light source with a narrow optical window to develop a narrow band of light; and
    b. means to move said optical window between said juxtapositioned edges of said plates.

3. The children's drawing toy of claim 2 wherein said light source :s tubular and said light screen is a cylinder concentrically mounted about said source and wherein said optical window is a longitudinal slot in said cylinder.

4. The children's drawing toy of claim 3 wherein said cylinder is mounted for rotational movement about said light source.

5. The children's drawing toy of claim 2 including at least one optical color filter mounted adjacent said light window to provide a band of colored light.

6. The children's drawing toy of claim 5 wherein said light filter is cylindrical with a plurality of cylindrical color sections of varied colors and is mounted for rotational movement about said light source whereby a selected one of said color sections can be rotated between said light source and said window.

7. The children's drawing toy of claim 1 wherein said plates are glass.

8. The children's drawing toy of claim 1 wherein said plates are of a transparent rigid plastic.

9. The children's drawing toy of claim 1 wherein said plates are mounted in parallel relationship in a stacked array.

10. The children's drawing toy of claim 1 including preprinted art panels with means to transfer said panels to said plates as said images.

11. The children's drawing toy of claim 1 wherein said light source and screen, and said plates are contained within a surrounding housing.

12. The children's drawing toy of claim 11 wherein said plates are pivotally mounted in said housing for movement to provide access to their planar surfaces.

13. The children's drawing toy of claim 12 wherein the top of said housing has an opening to provide a recess which receives said plates.

14. The children's drawing toy of claim 13 wherein said plates are mounted for pivotal movement in said recess whereby the uppermost of the plates can be pivoted to expose the planar surface of the subjacent ones of said plates.

15. The children's drawing toy of claim 14 wherein said light source is tubular and is contained within said housing.

16. The children's drawing toy of claim 1 wherein said light source is a fluorescent bulb.

17. The children's drawing toy of claim 1 wherein said light source is an incandescent bulb.

18. The children's drawing toy of claim 1 wherein said coating is a wax coating.

19. The children's drawing toy of claim 1 wherein said coating is a water base wax coating.

20. The children's drawing toy of claim 1 wherein said plates are separated from each other by a separation gap at least about 0.5 inch, sufficient to provide clearance therebetween for said coating.

* * * * *